(12) United States Patent
Feria et al.

(10) Patent No.: US 8,965,385 B2
(45) Date of Patent: Feb. 24, 2015

(54) STAGGERED CELLS FOR WIRELESS COVERAGE

(71) Applicant: The Boeing Company, Chicago, IL (US)

(72) Inventors: Ying J Feria, Manhattan Beach, CA (US); Greg Busche, Rancho Palos Verdes, CA (US); Murat E Veysoglu, Cypress, CA (US); John M Sullivan, Manhattan Beach, CA (US); Lori Shima, Manhattan Beach, CA (US); Becky Xiao-Chun Li, Rowland Heights, CA (US)

(73) Assignee: The Boeing Company, Chicago, IL (US)

( * ) Notice: Subject to any disclaimer, the term of this patent is extended or adjusted under 35 U.S.C. 154(b) by 136 days.

(21) Appl. No.: 13/734,030

(22) Filed: Jan. 4, 2013

(65) Prior Publication Data

US 2014/0194129 A1 Jul. 10, 2014

(51) Int. Cl.
*H04W 40/00* (2009.01)
*H04W 84/04* (2009.01)
*H04W 16/02* (2009.01)

(52) U.S. Cl.
CPC ............ *H04W 84/042* (2013.01); *H04W 16/02* (2013.01)
USPC ........... 455/447; 455/446; 455/448; 455/449; 455/427; 455/12.1

(58) Field of Classification Search
CPC ..... H04W 36/04; H04W 16/12; H04W 16/32; H04W 88/04; H04W 88/06; H04W 84/06; H04W 36/30; H04W 16/02; H04W 72/0453; H04W 16/10; H04W 16/24; H04W 72/04; H04W 84/047; H04W 84/042; H04W 84/04; H04B 7/2606; H04B 7/18513; H04B 7/18506; H04B 7/18515; H04B 7/2125; H04B 7/195; H04B 7/18563; H04B 1/7097; H04B 2201/709709
USPC .......... 455/7, 431, 11.1, 12.1, 13.1, 443, 444, 455/446–449
See application file for complete search history.

(56) References Cited

U.S. PATENT DOCUMENTS 5,408,514 A * 4/1995 Sakamoto et al. ............ 455/436
6,522,885 B1 * 2/2003 Tang et al. .................... 455/447
(Continued)

OTHER PUBLICATIONS

Kumar, V, Mobile Computing Cellular Technology, Computer Science University of Missouri-Kansas City, Kansas City, MO, US, Sep. 3, 2002, 8 pgs.

*Primary Examiner* — Allahyar Kasraian
(74) *Attorney, Agent, or Firm* — Womble, Carlyle, Sandridge & Rice, LLP

(57) ABSTRACT

A relay and distribution apparatus is provided for a cellular communication system. The relay and distribution apparatus includes an antenna system configured to lay down beams in overlapping first and M second N-cell frequency reuse patterns. The first frequency reuse pattern may be for communication of control channels of a cellular communication system, and the second frequency reuse patterns may be for communication of traffic channels exclusive of control channels of the cellular communication system. The second frequency reuse patterns may be staggered with one another. And cells of the second frequency reuse patterns may have a size only a fraction of which is for transmission of traffic channels any of which may be assignable through a control channel of the first reuse frequency pattern.

16 Claims, 6 Drawing Sheets

(56) References Cited

U.S. PATENT DOCUMENTS

| | | |
|---|---|---|
| 6,584,084 B1 * | 6/2003 | Barany et al. ............... 455/447 |
| 6,597,927 B1 * | 7/2003 | Eswara et al. ............. 455/562.1 |
| 6,866,231 B2 | 3/2005 | Higgins |
| 6,993,288 B2 | 1/2006 | de La Chapelle et al. |
| 7,110,716 B2 | 9/2006 | Rao et al. |
| 7,177,592 B2 * | 2/2007 | Jarett ............................ 455/12.1 |
| 2003/0153308 A1 * | 8/2003 | Karabinis ....................... 455/427 |
| 2004/0242152 A1 | 12/2004 | Jarett |
| 2007/0217355 A1 | 9/2007 | de La Chapelle et al. |
| 2007/0225002 A1 * | 9/2007 | Keller et al. ................... 455/448 |
| 2008/0153481 A1 | 6/2008 | Rosen et al. |
| 2009/0290601 A1 | 11/2009 | Wang et al. |
| 2010/0041396 A1 * | 2/2010 | Karabinis ....................... 455/427 |
| 2010/0173637 A1 * | 7/2010 | Damnjanovic et al. ....... 455/447 |
| 2011/0003553 A1 * | 1/2011 | Kim et al. ...................... 455/63.1 |
| 2011/0211486 A1 * | 9/2011 | GoldHammer ................ 370/252 |
| 2011/0312277 A1 * | 12/2011 | Gupta ............................. 455/63.1 |

\* cited by examiner

STAGGERED CELLS FOR WIRELESS COVERAGE

TECHNOLOGICAL FIELD

The present disclosure relates generally to cellular communication systems and, in particular, to staggered cells for wireless coverage in a cellular communication system.

BACKGROUND

Wireless communications access, on which our society and economy is growing increasingly dependent, is becoming pervasive in all aspects of daily societal functions. For example, wireless communication has become increasingly available to users on board mobile platforms such as land vehicles, aircraft, spacecraft, watercraft or the like. Wireless communication services for passengers of mobile platforms include Internet access, e.g., e-mail and web browsing, live television, voice services, virtual private network access and other interactive and real time services.

Wireless communication platforms for remote, hard to access, or mobile user terminals, e.g., mobile platforms, often use communication satellites that can provide service coverage over large geographic footprints, often including remote land-based or water-based regions. Generally, base stations, e.g., a ground based station, send information (e.g., data) to the user terminals through a bent pipe via one or more satellites. More specifically, the base stations send information on a forward link to the satellite that receives, amplifies and re-transmits the information to an antenna of one or more fixed or mobile user terminals. The user terminals, in turn, can send data back to the base stations via the satellite. The base stations can provide the user terminals with links to the Internet, public switched telephone networks, and/or other public or private networks, servers and services.

Modern satellites and other cellular communication systems often employ a number of spot beams providing a beam laydown that forms coverage over a geographic region that may be divided into a plurality of cells. In a communication system using spot beams, the same frequency may be used at the same time in two or more cells. These beams may be configured to maintain a predetermined co-polar isolation (e.g., carrier-to-interference ratio) value in order to minimize the interference among beams. This is called spatial isolation and spatial reuse. In one typical parlance, each spot beam may be assigned a color to create a color pattern that matches a frequency reuse pattern. Identical frequencies, then, may be reused by different beams with the same color.

Conventional cellular communication systems often use a three-, four- or seven-color pattern, which makes the cell size larger to achieve the same carrier-to-interference ratio. This may lead to a lower overall system capacity compared to a much higher-order frequency reuse pattern, such as a nine-, twelve- or higher-color pattern. Many systems avoid higher-order frequency reuse patterns, however, because their control-channel overhead increases proportionally. For example, if the system allocates one carrier for a control channel for every cell, then a seven-color pattern requires seven control-channel carriers. Similarly, for example, a nine-color pattern requires nine control-channel carriers, a twelve-color pattern requires twelve control-channel carriers, and so forth. For most conventional communication systems, this high control-channel overhead makes higher-order frequency reuse patterns impractical.

BRIEF SUMMARY

Example implementations of the present disclosure are generally directed to a relay and distribution apparatus and associated method of laying down beams for transmission of control and traffic channels in a cellular communication system. Example implementations of the present disclosure may increase system capacity by a more-efficient frequency reuse scheme for control and traffic channels. In accordance with example implementations, higher-order cell frequency reuse patterns may be used to increase traffic capacity while avoiding control-channel overhead that may otherwise be associated with the higher-order reuse pattern.

According to one aspect of example implementations, a relay and distribution apparatus is provided for a cellular communication system, and that includes a communication platform and an antenna system. The antenna system is carried by the communication platform and includes at least one array of antenna feeds. The antenna system may be configured to lay down beams covering respective cells of the cellular communication system. The antenna system may be configured to lay down beams in overlapping P-cell and Q-cell frequency reuse patterns. The P-cell frequency reuse pattern may be for communication of control channels of the cellular communication system, and the Q-cell frequency reuse pattern may be for communication of traffic channels exclusive of control channels of the cellular communication system. According to this aspect, any traffic channel of the Q-cell frequency reuse pattern may be assignable through a control channel of the P-cell frequency reuse pattern.

In one example, Q may be greater than P, and cells of the Q-cell frequency reuse pattern may be smaller in size than those of the P-cell frequency reuse pattern. In one example, at least some of the cells of the Q-cell frequency reuse pattern may overlap one cell of the P-cell frequency reuse pattern, and other cells of the Q-cell frequency reuse pattern may overlap more than one cell of the P-cell frequency reuse pattern.

Another aspect of example implementations also provides a relay and distribution apparatus for a cellular communication system. According to this other aspect, the antenna system of the relay and distribution apparatus may be configured to lay down beams in overlapping first and M≥2 second N-cell frequency reuse patterns. The first N-cell frequency reuse pattern may be for communication of control channels of the cellular communication system, and the M second N-cell frequency reuse patterns may be for communication of traffic channels exclusive of control channels of the cellular communication system. The M second N-beam frequency reuse patterns may be staggered with one another, and cells of the M second N-cell frequency reuse patterns have a size only a fraction of which is for transmission of traffic channels any of which is assignable through a control channel of the first N-cell frequency reuse pattern.

In various examples, the M second N-cell frequency reuse patterns may be staggered such that the fractions of the cells for transmission of traffic channels form an effective M×N-cell frequency reuse pattern. In one example, cells of the M second N-cell frequency reuse patterns may have a size only 1/M of which is for communication of traffic channels.

In various examples, the fraction of each cell of the M second N-cell frequency reuse patterns may overlap one, two or three cells of the first N-cell frequency reuse pattern. For example, when M is an even number, the fraction of each cell of the M second N-cell frequency reuse patterns may overlap one or two cells of the first N-cell frequency reuse pattern, and when M is an odd number, the fraction of each cell of the M second N-cell frequency reuse patterns may overlap one or three cells of the first N-cell frequency reuse pattern.

In other aspects of example implementations, methods are provided for laying down beams in frequency reuse patterns for communication of control and traffic channels in a cellular communication system. The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
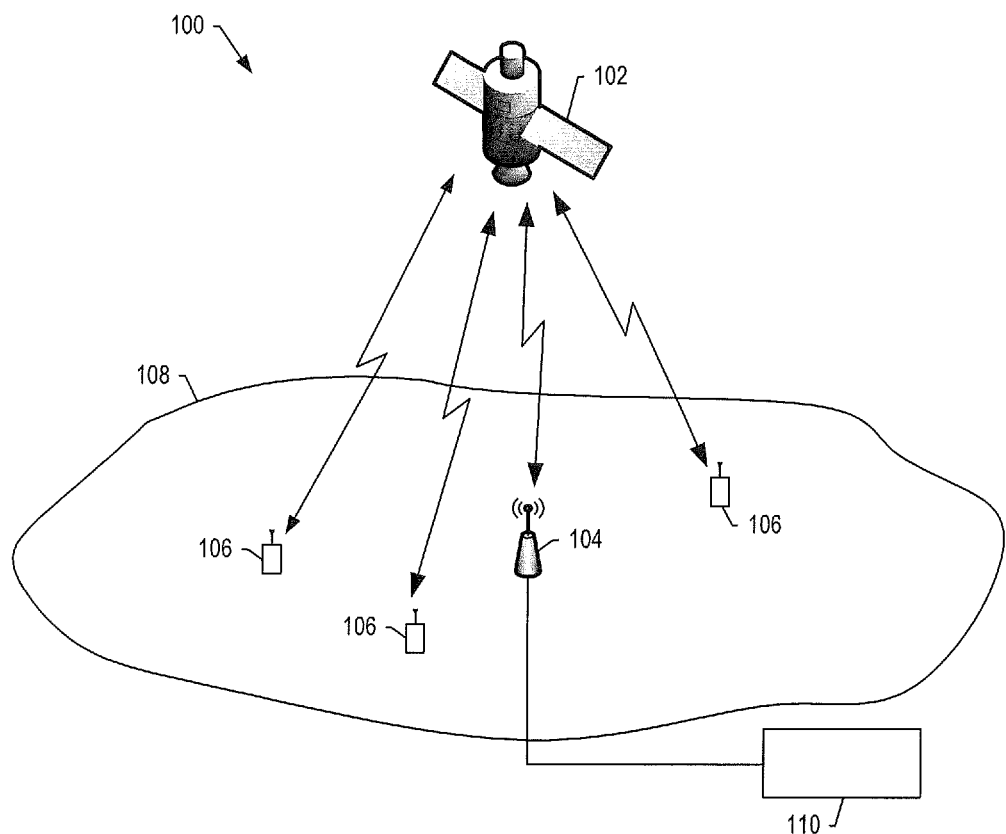
FIG. 1 illustrates a cellular communication system according to one example implementation of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, reference may be made herein to dimensions of or relationships between components. Those and other similar relationships may be absolute or approximate to account for variations that may occur, such as those due to engineering tolerances or the like. Like reference numerals refer to like elements throughout.

The present disclosure relate to staggered cells for wireless coverage in a cellular communication system. Example implementations of the present disclosure may be shown and described herein with reference to a satellite communication system. It should be understood, however, that the present disclosure may be equally applicable to any of a number of other types of cellular communication systems. For example, various example implementations may be equally applicable to a terrestrial cellular communication system in which base stations and user terminals communicate directly with one another without use of a satellite. In some example implementations, the cellular communication system may include other types of apparatuses in addition to or in lieu of a satellite, such as one or more other types of relay and distribution apparatuses, which in various examples may be located on land or onboard a mobile platform (e.g., land vehicle, aircraft, spacecraft, watercraft). Thus, although the communications system of example implementations may be shown and described as including one or more satellites, the communications system may more broadly include one or more relay and distribution apparatuses.

FIG. 1 illustrates one example of a cellular communication system 100 in accordance with various example implementations of the present disclosure. As shown, the cellular communication system may be a satellite communication system including one or more satellites 102, one or more satellite ground base stations 104 and one or more user terminals 106. The satellite may cover a geographic region 108 in which the base station and one or more user terminals may be located. The base station may be coupled to or otherwise part of one or more networks 110, such as the Internet, a public switched telephone network (PSTN), private networks such as corporate and government networks, and/or other servers and services.

In various examples, the satellite 102 and base station 104 may enable communication between user terminals 106 and the network 110. In this regard, the base station may receive information (e.g., data) from the network, and communicate the information to the satellite. The satellite may in turn transmit or relay the information to one or more user terminals. Conversely, for example, the satellite may receive information from a user terminal, and communicate the information to the base station, which may in turn transmit or relay the information to the network. This type of communication may at times be referred to as "bent-pipe" communication. It should be understood, however, that example implementations may also be applicable to other types of satellite systems, such as those with on-board packet switching.

The satellite 102 may employ a number of spot beams providing a beam laydown that forms coverage over the geographic region 108, which may be divided into a plurality of cells. The beams in one example may cover respective cells of the cellular communication system. Each beam may be assigned some beam indicia to create a pattern that matches a frequency reuse pattern for the satellite. In some examples, the beam indicia may be colors or cells, or may be alpha, numeric or alpha-numeric characters. In accordance with example implementations of the present disclosure, the satellite may use same frequency at the same time for two or more cells. That is, the satellite may reuse same frequency in different beams with the same color. In one example, the reuse distance may be measured from the center of one beam to the edge of another beam with the same color.

Figure 2:
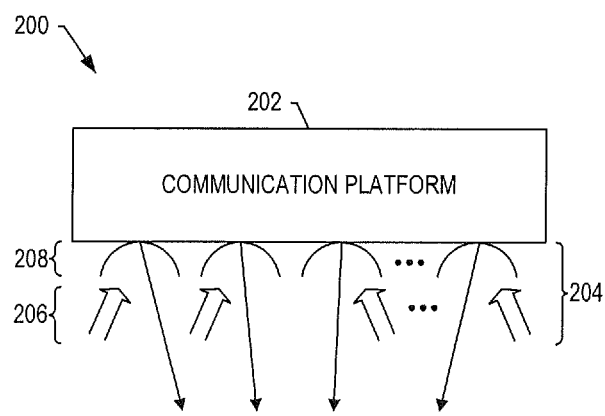
FIG. 2 is a schematic block diagram of a relay and distribution apparatus according to one example implementation of the present disclosure.

FIG. 2 illustrates a relay and distribution apparatus 200 according to example implementations of the present disclosure. In one example, the relay and distribution apparatus 200 may correspond to a satellite 102 of the cellular communication system 100 of FIG. 1. The relay and distribution apparatus may be generally configured to lay down beams covering respective cells of a cellular communication system such as that shown in FIG. 1. As shown in FIG. 2, the relay and distribution apparatus may include a communication platform 202 that carries an antenna system 204 including at least one array of antenna feeds 206, and possibly also one or more reflectors 208. Each reflector serves one of a plurality of beams in a frequency reuse pattern and may have in its focal plane an array of antenna feeds, each of which may generate a beam in that reflector's frequency.

In various examples, the communication platform 202 of the relay and distribution apparatus 200 may carry an antenna system 204 including a plurality of antenna feeds 206 and reflectors 208 to provide a plurality of beams. In some examples, the apparatus may lay down different sets of beams in respective frequency reuse patterns, and the communication platform may carry an antenna system including reflectors and antenna feeds for each beam of each set. The communication platform may generally carry an antenna system including one or more arrays of antenna feeds to provide a number of sets of frequency reuse patterns.

The relay and distribution apparatus 200, and more specifically the antenna system 204, may be configured to lay down beams in a number of frequency reuse patterns for communication (transmission or reception) of control and traffic channels in the cellular communication system (e.g., cellular communication system 100). In accordance with example implementations of the present disclosure, the antenna system may increase system capacity by a more-efficient frequency reuse scheme for control and traffic channels. In accordance with example implementations, higher-order cell frequency reuse patterns may be used to increase traffic capacity while avoiding control-channel overhead that may otherwise be associated with the higher-order reuse pattern.

In accordance with one aspect of example implementations, the antenna system 204 may be configured to lay down beams in overlapping P-cell and Q-cell frequency reuse patterns. The P-cell frequency reuse pattern may be for communication of control channels of the cellular communication system, and the Q-cell frequency reuse pattern may be for communication of traffic channels exclusive of control channels of the cellular communication system.

Figure 5:
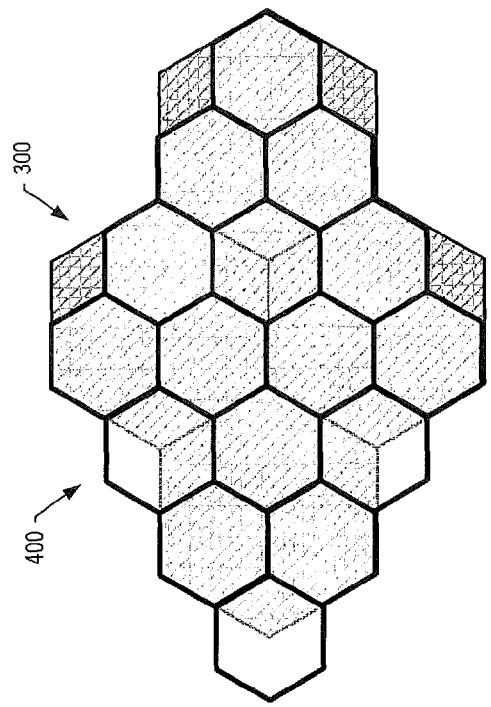
FIGS. 3, 4 and 5 illustrate beams laid down in overlapping frequency reuse patterns according to one aspect of example implementations of the present disclosure.
Figure 3:
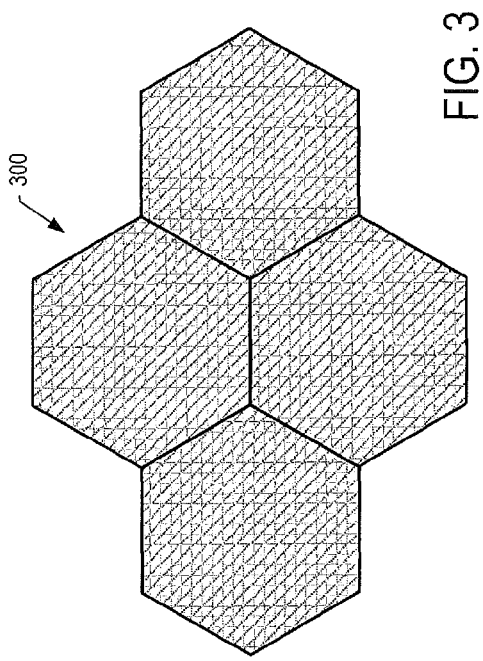
Figure 4:
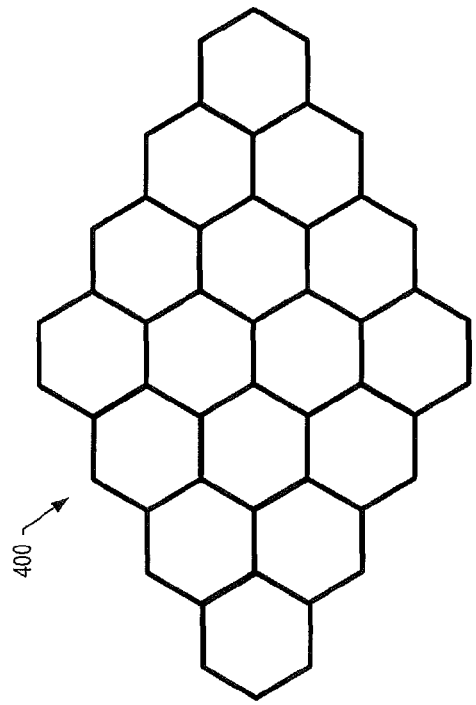

In one example, Q may be greater than P, and cells of the Q-cell frequency reuse pattern may be smaller in size than those of the P-cell frequency reuse pattern. In one example, at least some of the cells of the Q-cell frequency reuse pattern may overlap one cell of the P-cell frequency reuse pattern, and other cells of the Q-cell frequency reuse pattern may overlap more than one cell of the P-cell frequency reuse pattern. FIGS. 3, 4 and 5 illustrate one example of the above aspect in which P=4 and Q=16. In this regard, FIG. 3 illustrates a 4-cell frequency reuse pattern 300, FIG. 4 illustrates a 16-cell frequency reuse pattern 400, and FIG. 5 illustrates one example manner by which the 16-cell frequency reuse pattern may overlap the 4-cell frequency reuse pattern. As shown by this example, traffic channels of the 16-cell frequency reuse pattern may be covered by control channels of only a 4-cell frequency reuse pattern.

DE

According to this aspect of example implementations, any traffic channel of the Q-cell frequency reuse pattern may be assignable through a control channel of the P-cell frequency reuse pattern. In the case of the cellular communication system 100 of FIG. 1, a ground base station 104 or user terminal 106 within a cell of the P-cell frequency reuse pattern may be assigned through a respective control channel to a traffic channel of a cell of the Q-cell frequency reuse pattern overlapping the respective cell of the P-cell frequency reuse pattern, such as based on the location of the base station or user terminal. The location may be known or may be determined such as by Global Positioning System (GPS), assisted GPS (A-GPS) or the like. The antenna system 204 of this example may therefore provide Q-cell frequency reuse pattern for traffic channels, but only require a fewer, P-cell frequency reuse pattern for control channels covering the respective traffic channels.

In accordance with another aspect of example implementations, the antenna system 204 may be configured to lay down beams in overlapping first and M≥2 second N-cell frequency reuse patterns, only the first of which may be for control channels, and the others of which may be for traffic channels. The M second N-cell frequency reuse patterns may be staggered with one another. According to this example aspect, cells of the M second N-cell frequency reuse patterns have a size only a fraction of which, such as 1/M, may be for transmission of traffic channels any of which is assignable through a control channel of the first N-cell frequency reuse pattern. The antenna system of this example may therefore achieve an effective M×N-cell frequency reuse pattern for traffic channels, while only requiring an N-cell frequency reuse pattern for control channels through which the traffic channels may be assigned.

In various examples, the fraction of each cell of the M second N-cell frequency reuse patterns (for communication of traffic channels) may overlap one, two or three cells of the first N-cell frequency reuse pattern (for communication of control channels). For example, the fraction of each cell of the M second N-cell frequency reuse patterns may overlap one or two cells of the first N-cell frequency reuse pattern when M is an even number, and may overlap one or three cells of the first N-cell frequency reuse pattern when M is an odd number. In various examples, this may result in the fractions of cells for communication of traffic channels forming an effective M×N-cell frequency reuse pattern.

According to this aspect of example implementations, any traffic channel of the M second N-cell frequency reuse patterns may be assignable through a control channel of the first N-cell frequency reuse pattern. In the case of the cellular communication system 100 of FIG. 1, a ground base station 104 or user terminal 106 within a cell of the first N-cell frequency reuse pattern may be assigned through a respective control channel to a traffic channel of a cell of the M second N-cell frequency reuse patterns overlapping the respective cell of the first N-cell frequency reuse pattern. Similar to before, this traffic channel assignment may be based on the location of the base station or user terminal (e.g., GPS, A-GPS). The antenna system 204 of this example may provide an M×N-cell frequency reuse pattern for traffic channels, but only require a fewer, N-cell frequency reuse pattern for control channels covering the respective traffic channels.

Figure 6:
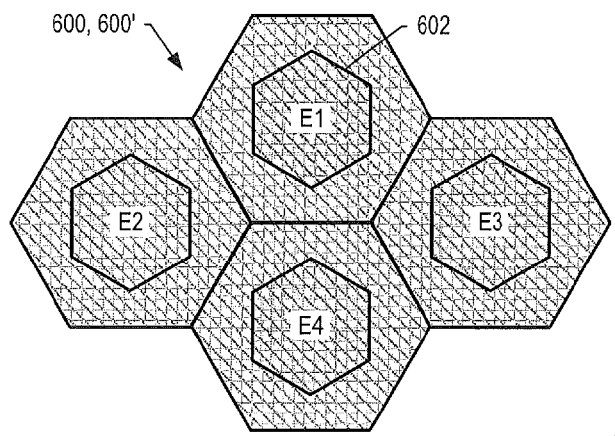
FIGS. 6, 7, 8, 9 and 10 illustrate beams laid down in three staggered frequency reuse patterns according to another aspect of example implementations of the present disclosure.
Figure 7:
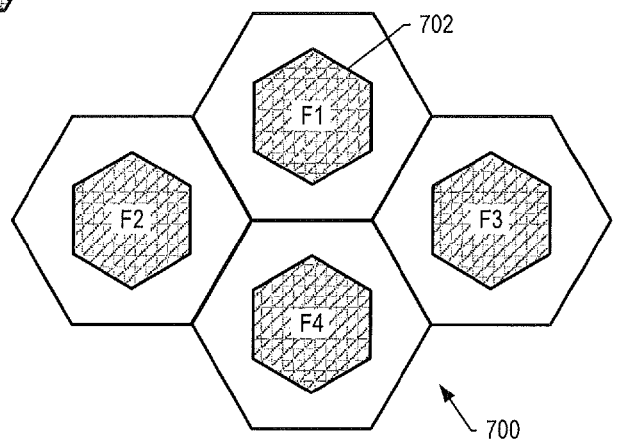
Figure 8:
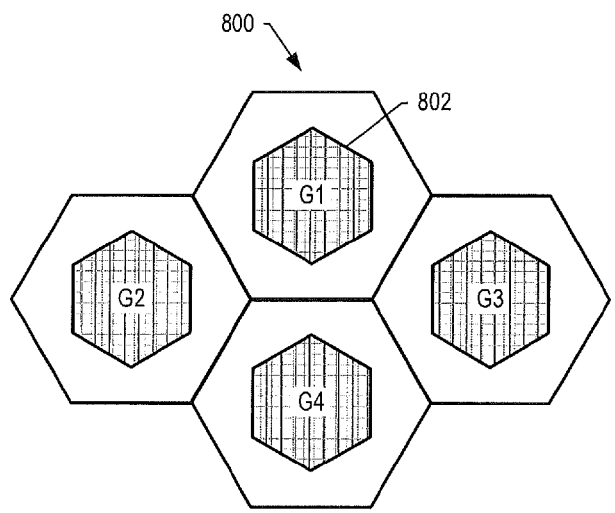

FIGS. 6, 7, 8, 9 and 10 illustrate one example of the above second aspect in which N=4 and M=3. FIG. 6 illustrates a first 4-cell frequency reuse pattern 600 for communication of control channels. FIG. 6 also illustrates one second 4-cell frequency reuse pattern 600' (coincident with the first pattern) for communication of traffic channels exclusive of control channels, with the cells being shown as E1, E2, E3 and E4. FIGS. 7 and 8 illustrate other respective second 4-cell frequency reuse patterns 700, 800 for transmission of traffic channels exclusive of control channels. The cells of FIG. 7 are shown as F1, F2, F3 and F4, and the cells of FIG. 8 are shown as G1, G2, G3 and G4. As shown, the cells of the three second 4-cell frequency reuse patterns 600, 700 and 800 may have a size only respective fractions 602, 702 and 802 (e.g., ⅓) of which may be for transmission of traffic channels.

Figure 9:
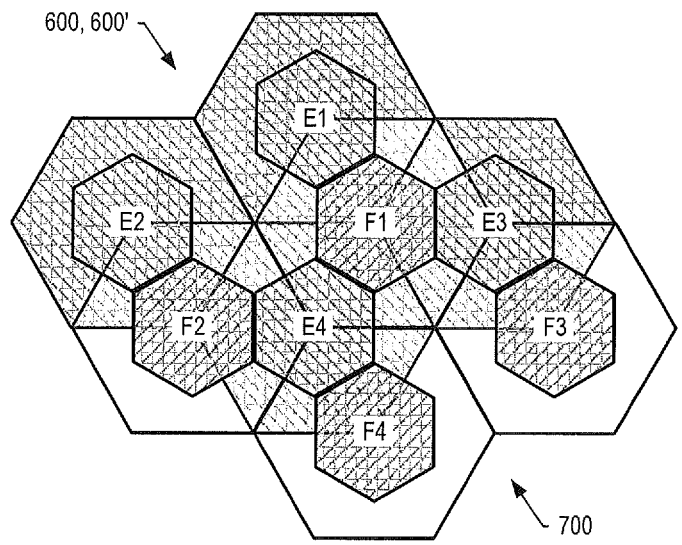
Figure 10:
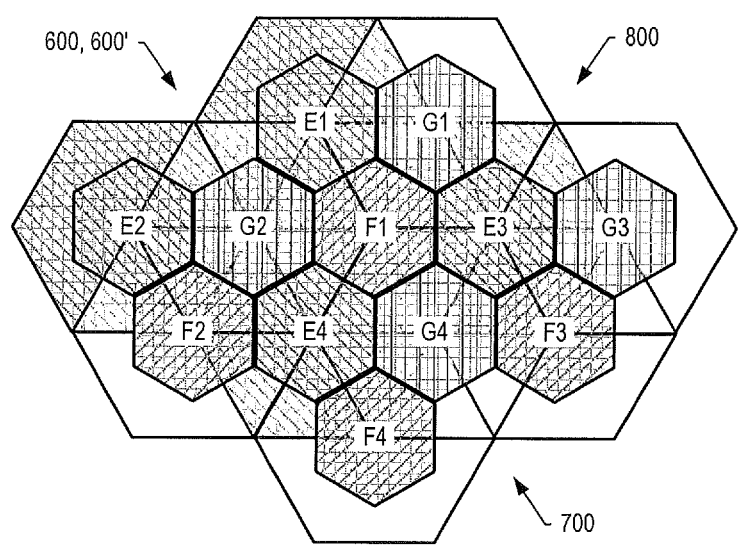

FIG. 9 shows the first frequency reuse pattern 600 and two of the second frequency reuse patterns 600', 700 staggered with one another, and FIG. 10 shows the respective second frequency reuse patterns further staggered with the other second frequency reuse pattern 800. As shown for M=3 (odd number), the fraction of each cell of the three second frequency reuse patterns 600', 700, 800 may overlap one or three cells of the first frequency reuse pattern 600. As also shown, for example, the three second 4-cell frequency reuse patterns may be staggered such that the fractions 602, 702 and 802 of the cells for communication of traffic channels form an effective 12-cell frequency reuse pattern.

Again, in the case of the cellular communication system 100 of FIG. 1, a ground base station 104 or user terminal 106 within one of the cells of the first frequency reuse pattern 600 may be assigned through a respective control channel to the traffic channel of a cell of the M second frequency reuse patterns 600', 700, 800. For example, a base station or user terminal within E3 may be assigned to the traffic channel in the fraction of E3, F1, F2, F3, G1, G3 or G4, depending on the location of the base station or user terminal within E3. Similarly, for example, a base station or user terminal within E4 may be assigned to the traffic channel in the fraction of E4, F1, F2, F4, G1, G2 or G4, depending on the location of the base station or user terminal within E4.

Figure 11:
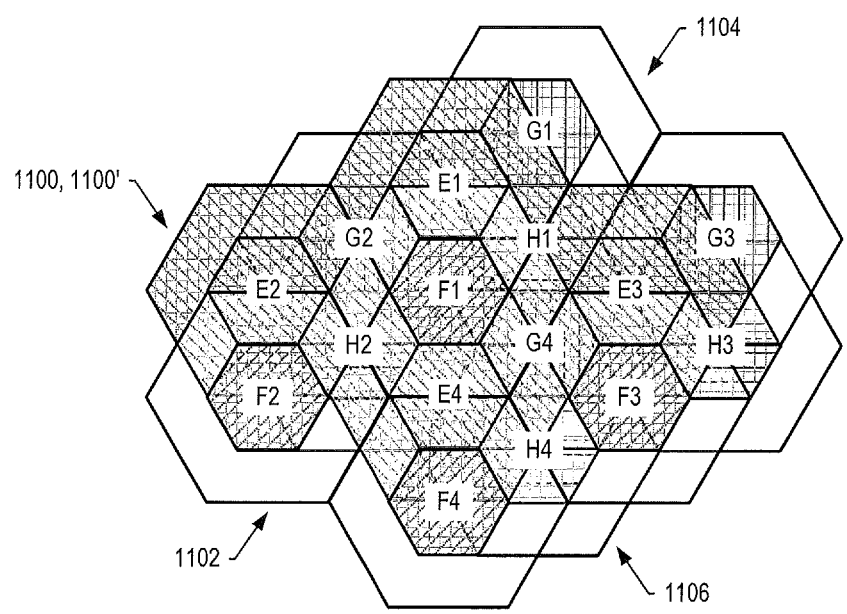
FIG. 11 illustrates beams laid down in four staggered frequency reuse patterns according to the other aspect of example implementations of the present disclosure.

FIG. 11 illustrates another example of the above second aspect in which N=4 and M=4. As shown, beams may be laid down in a first 4-cell frequency reuse pattern 1100 for communication of control channels, and a coincident second 4-cell frequency reuse pattern 1100' for communication of traffic channels exclusive of control channels, with the cells being shown as E1, E2, E3 and E4. FIG. 11 also illustrates three other second 4-cell frequency reuse patterns 1102, 1104 and 1106 for communication of traffic channels exclusive of control channels. The cells of one of the three other second patterns are shown as F1, F2, F3 and F4, another are shown as G1, G2, G3 and G4, and the last are shown as H1, H2, H3 and H4. Again, the cells of the four second 4-cell frequency reuse patterns may have a size only respective fractions (e.g., ¼) of which may be for transmission of traffic channels.

As shown in FIG. 11, for M=4 (even number), the fraction of each cell of the four second frequency reuse patterns 1100', 1102, 1104 and 1106 may overlap one or two of cells of the first frequency reuse pattern 1100. As also shown, for example, the four second 4-cell frequency reuse patterns may be staggered such that the fractions of the cells for transmission of traffic channels form an effective 16-cell frequency reuse pattern.

The above examples illustrate cases in which (N, M) may be (3, 4) or (4, 4). In other instances, N, M may be any of a number of other numbers of cells and second N-cell frequency reuse patterns, respectively. Other examples of suitable cases include (N, M) being any of (4, 3), (3, 7), (7, 3), (4, 7), (7, 4), (3, 9) or (9, 3). In these examples, again, the antenna system 204 may achieve an effective M×N-cell frequency reuse pattern for transmission of traffic channels, while only requiring an N-cell frequency reuse pattern for transmission of control channels through which the traffic channels may be assigned.

Figure 12:
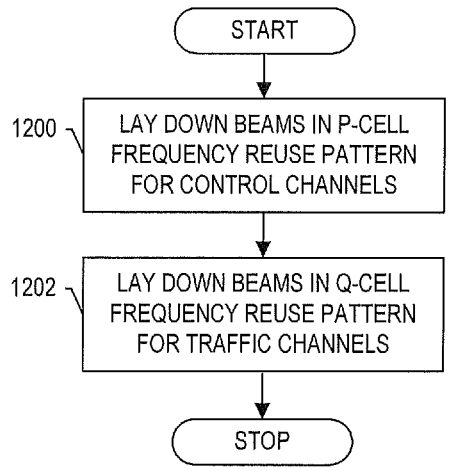
FIGS. 12 and 13 illustrate flowcharts including various operations in methods of aspects of example implementations of the present disclosure.

FIG. 12 illustrates a flowchart including various operations in a method of one aspect of example implementations of the present disclosure. As shown in blocks 1200, 1202 the method of this aspect includes laying down beams of an antenna system covering respective cells of a cellular communication system, with the beams being laid down in overlapping P-cell and Q-cell frequency reuse patterns. The P-cell frequency reuse pattern may be for communication of control channels of the cellular communication system, and the Q-cell frequency reuse pattern may be for communication of traffic channels exclusive of control channels of the cellular communication system. According to this aspect, any traffic channel of the Q-cell frequency reuse pattern may be assignable through a control channel of the P-cell frequency reuse pattern.

Figure 13:
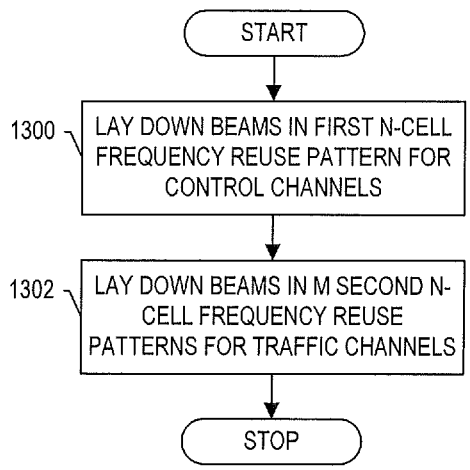

FIG. 13 illustrates a flowchart including various operations in a method of another aspect of example implementations of the present disclosure. As shown in blocks 1300, 1302 the method of this aspect includes laying down beams of an antenna system covering respective cells of a cellular communication system, with the beams being laid down in overlapping first and M second N-beam frequency reuse patterns. The first N-cell frequency reuse pattern may be for communication of control channels of the cellular communication system, and the M second N-cell frequency reuse patterns may be for communication of traffic channels exclusive of control channels of the cellular communication system. According to this aspect, the M second N-cell frequency reuse patterns are staggered with one another, and cells of the second N-cell frequency reuse patterns may have a size only a fraction of which is for transmission of traffic channels any of which may be assignable through a control channel of the first N-cell frequency reuse patterns.

Many modifications and other implementations of the disclosure set forth herein will come to mind to one skilled in the art to which this disclosure pertains having the benefit of the teachings presented in the foregoing description and the associated drawings. Therefore, it is to be understood that the disclosure not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A relay and distribution apparatus comprising:
   a communication platform; and
   an antenna system carried by the communication platform and including at least one array of antenna feeds, the antenna system being configured to lay down beams covering respective cells of a cellular communication system,
   wherein the antenna system is configured to lay down beams in overlapping P-cell and Q-cell frequency reuse patterns, Q being different in number than P, each cell of the Q-cell frequency reuse pattern overlapping one or more cells of the P-cell frequency reuse pattern, the P-cell frequency reuse pattern being for communication of control channels of the cellular communication system, and the Q-cell frequency reuse pattern being for communication of traffic channels exclusive of control channels of the cellular communication system,
   wherein any traffic channel of the Q-cell frequency reuse pattern is assignable through a control channel of the P-cell frequency reuse pattern.

2. The relay and distribution apparatus of claim 1, wherein Q is greater than P, and cells of the Q-cell frequency reuse pattern are smaller in size than those of the P-cell frequency reuse pattern.

3. The relay and distribution apparatus of claim 1, wherein at least some of the cells of the Q-cell frequency reuse pattern overlap one cell of the P-cell frequency reuse pattern, and other cells of the Q-cell frequency reuse pattern overlap more than one cell of the P-cell frequency reuse pattern.

4. A relay and distribution apparatus comprising:
   a communication platform; and
   an antenna system carried by the communication platform and including at least one array of antenna feeds, the antenna system being configured to lay down beams covering respective cells of a cellular communication system, wherein the antenna system is configured to lay down beams in overlapping first and M≥2 second N-cell frequency reuse patterns, the first N-cell frequency reuse pattern being for communication of control channels of the cellular communication system, and the M second N-cell frequency reuse patterns being for communication of traffic channels exclusive of control channels of the cellular communication system, and wherein the M second N-cell frequency reuse patterns are staggered with one another, and cells of the M second N-cell frequency reuse patterns have a size only a fraction of which is for transmission of traffic channels any of which is assignable through a control channel of the first N-cell frequency reuse pattern, the fraction of each cell of the M second N-cell frequency reuse patterns overlapping one or more cells of the first N-cell frequency reuse pattern.

5. The relay and distribution apparatus of claim 4, wherein the fraction of each cell of the M second N-cell frequency reuse patterns overlaps one, two or three cells of the first N-cell frequency reuse pattern.

6. The relay and distribution apparatus of claim 5, wherein when M is an even number, the fraction of each cell of the M second N-cell frequency reuse patterns overlaps one or two cells of the first N-cell frequency reuse pattern, and when M is an odd number, the fraction of each cell of the M second N-cell frequency reuse patterns overlaps one or three cells of the first N-cell frequency reuse pattern.

7. The relay and distribution apparatus of claim 4, wherein cells of the M second N-cell frequency reuse patterns have a size only 1/M of which is for transmission of traffic channels.

8. The relay and distribution apparatus of claim 4, wherein the M second N-cell frequency reuse patterns are staggered such that the fractions of the cells for transmission of traffic channels form an effective M×N-cell frequency reuse pattern.

9. A method comprising:

laying down beams of an antenna system covering respective cells of a cellular communication system, the beams being laid down in overlapping P-cell and Q-cell frequency reuse patterns, Q being different in number than P, each cell of the Q-cell frequency reuse pattern overlapping one or more cells of the P-cell frequency reuse pattern, the P-cell frequency reuse pattern being for communication of control channels of the cellular communication system, and the Q-cell frequency reuse pattern being for communication of traffic channels exclusive of control channels of the cellular communication system, wherein any traffic channel of the Q-cell frequency reuse pattern is assignable through a control channel of the P-cell frequency reuse pattern.

10. The method of claim 9, wherein Q is greater than P, and cells of the Q-cell frequency reuse pattern are smaller in size than those of the P-cell frequency reuse pattern.

11. The method of claim 9, wherein at least some of the cells of the Q-cell frequency reuse pattern overlap one cell of the P-cell frequency reuse pattern, and other cells of the Q-cell frequency reuse pattern overlap more than one cell of the P-cell frequency reuse pattern.

12. A method comprising:

laying down beams of an antenna system covering respective cells of a cellular communication system, the beams being laid down in overlapping first and M≥2 second N-cell frequency reuse patterns, the first N-cell frequency reuse pattern being for communication of control channels of the cellular communication system, and the M second N-cell frequency reuse patterns being for communication of traffic channels exclusive of control channels of the cellular communication system, wherein the M second N-cell frequency reuse patterns are staggered with one another, and cells of the M second N-cell frequency reuse patterns have a size only a fraction of which is for transmission of traffic channels any of which is assignable through a control channel of the first N-cell frequency reuse pattern, the fraction of each cell of the M second N-cell frequency reuse patterns overlapping one or more cells of the first N-cell frequency reuse pattern.

13. The method of claim 12, wherein the fraction of each cell of the M second N-cell frequency reuse patterns overlaps one, two or three cells of the first N-cell frequency reuse pattern.

14. The method of claim 13, wherein when M is an even number, the fraction of each cell of the M second N-cell frequency reuse patterns overlaps one or two of cells of the first N-cell frequency reuse pattern, and when M is an odd number, the fraction of each cell of the M second N-cell frequency reuse patterns overlaps one or three cells of the first N-cell frequency reuse pattern.

15. The method of claim 12, wherein cells of the M second N-cell frequency reuse patterns have a size only 1/M of which is for transmission of traffic channels.

16. The method of claim 12, wherein the M second N-cell frequency reuse patterns are staggered such that the fractions of the cells for transmission of traffic channels form an effective M×N-cell frequency reuse pattern.

* * * * *